(12) United States Patent
Barriere et al.

(10) Patent No.: US 12,479,130 B2
(45) Date of Patent: Nov. 25, 2025

(54) PRODUCTION OF RUBBER MIXTURES IN A RUBBER MIXTURE PRODUCTION LINE INCORPORATING ONE OR MORE TWIN-SCREW MIXING AND EXTRUSION MACHINES

(71) Applicant: COMPAGNIE GENERALE DES ETABLISSEMENTS MICHELIN, Clermont-Ferrand (FR)

(72) Inventors: Frederic Barriere, Clermont-Ferrand (FR); Bruno Dussardier, Clermont-Ferrand (FR); Laurent Huc, Clermont-Ferrand (FR); Aurelien Tournebize, Clermont-Ferrand (FR); Randria Tsilavo, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 404 days.

(21) Appl. No.: 18/010,987

(22) PCT Filed: Jun. 10, 2021

(86) PCT No.: PCT/EP2021/065612
§ 371 (c)(1),
(2) Date: Dec. 16, 2022

(87) PCT Pub. No.: WO2021/254870
PCT Pub. Date: Dec. 23, 2021

(65) Prior Publication Data
US 2023/0226722 A1 Jul. 20, 2023

(30) Foreign Application Priority Data
Jun. 16, 2020 (FR) ..................................... 2006265

(51) Int. Cl.
*B29B 7/74* (2006.01)
*B29B 7/18* (2006.01)
(Continued)

(52) U.S. Cl.
CPC ............ *B29B 7/7485* (2013.01); *B29B 7/183* (2013.01); *B29B 7/566* (2013.01); *B29B 7/7461* (2013.01); *B29B 7/7495* (2013.01); *B29B 7/82* (2013.01)

(58) Field of Classification Search
CPC ........................... B29B 7/7485; B29B 7/7495
See application file for complete search history.

(56) References Cited

U.S. PATENT DOCUMENTS

| | | |
|---|---|---|
| 4,300,839 A | 11/1981 | Sakagami |
| 5,302,635 A | 4/1994 | Brinkmann et al. |

(Continued)

FOREIGN PATENT DOCUMENTS

| | | |
|---|---|---|
| CN | 201664991 U | 12/2010 |
| CN | 102019649 A | 4/2011 |

(Continued)

OTHER PUBLICATIONS

International Search Report dated Sep. 3, 2021, in corresponding PCT/EP2021/065612 (3 pages).

*Primary Examiner* — Elizabeth Insler
(74) *Attorney, Agent, or Firm* — VENABLE LLP

(57) ABSTRACT

A production line (200) for performing multi-pass mixing sequences of rubber mixtures has at least one first mixing line (200A) that produces a masterbatch and at least one second line (200B) that performs a final mixing process during a final pass of a multi-pass rubber mixing sequence. A mixing process produces a variety of rubber mixtures in a production line of the type disclosed.

10 Claims, 8 Drawing Sheets

(51) Int. Cl.
 *B29B 7/56* (2006.01)
 *B29B 7/82* (2006.01)

(56) References Cited

U.S. PATENT DOCUMENTS

| | | | |
|---|---|---|---|
| 5,415,823 A * | 5/1995 | Peter | B29B 7/7495 366/77 |
| 7,404,664 B2 | 7/2008 | Borzenski et al. | |
| 7,556,419 B2 | 7/2009 | Colombo | |
| 9,533,431 B2 | 1/2017 | Magne et al. | |
| 10,328,608 B2 | 6/2019 | Bornes et al. | |
| 10,471,627 B2 | 11/2019 | Juillard et al. | |
| 11,267,163 B2 | 3/2022 | Le-Bars et al. | |
| 12,042,957 B2 | 7/2024 | Dussardier et al. | |
| 2011/0067800 A1 | 3/2011 | Bottomley et al. | |
| 2014/0360656 A1 | 12/2014 | Magne et al. | |
| 2018/0290336 A1 | 10/2018 | Bornes et al. | |
| 2018/0290338 A1 | 10/2018 | Juillard et al. | |
| 2019/0134852 A1* | 5/2019 | Le-Bars | B29B 7/568 |
| 2019/0210249 A1 | 7/2019 | Le-Bars et al. | |
| 2021/0113975 A1 | 4/2021 | Colombo | |
| 2022/0152874 A1 | 5/2022 | Dussardier et al. | |
| 2022/0161457 A1 | 5/2022 | Dussardier et al. | |
| 2022/0176591 A1 | 6/2022 | Dussardier et al. | |
| 2022/0258379 A1 | 8/2022 | Dussardier et al. | |
| 2023/0330895 A1 | 10/2023 | Barriere et al. | |

FOREIGN PATENT DOCUMENTS

| | | | |
|---|---|---|---|
| CN | 102294764 A | 12/2011 | |
| EP | 2707189 B1 | 7/2016 | |
| EP | 3359361 A1 | 8/2018 | |
| EP | 3359362 B1 | 9/2019 | |
| FR | 3044949 A1 | 6/2017 | |
| FR | 3045173 A1 | 6/2017 | |
| FR | 3093456 A1 | 9/2020 | |
| FR | 3093457 A1 | 9/2020 | |
| FR | 3093458 A1 | 9/2020 | |
| FR | 3093459 A1 | 9/2020 | |
| JP | 63-168311 A | 7/1988 | |
| JP | 2008-229893 A | 10/2008 | |
| JP | 2010-89423 A | 4/2010 | |
| JP | 2010089423 A * | 4/2010 | B29C 48/385 |
| KR | 10-0559201 B1 | 3/2006 | |
| WO | 2017/202585 A1 | 11/2017 | |
| WO | 2018/185386 A1 | 10/2018 | |
| WO | 2019/162803 A1 | 8/2019 | |
| WO | 2020/178069 A1 | 9/2020 | |

* cited by examiner

PRODUCTION OF RUBBER MIXTURES IN A RUBBER MIXTURE PRODUCTION LINE INCORPORATING ONE OR MORE TWIN-SCREW MIXING AND EXTRUSION MACHINES

TECHNICAL DOMAIN

The invention relates to rubber mixture production lines. More particularly, the invention relates to rubber mixture production lines performing single-pass and multi-pass sequences and having at least one mixing machine of the twin-screw mixer type that performs a mixing process.

BACKGROUND

The production of rubber mixtures involves multiple successive mixing steps. An initial mixture of elastomeric materials with a carbon black and/or silica filler is often performed inside an internal mixer (or "MI"), where the temperature of the mixture rises, for example, to values between 130° C. and 180° C. An automated external mixer (also known as a "roll mixer" or "roller tool"), into which this mixture is then transferred, works by further circulating it between two rolls to transform it into a continuous sheet. Vulcanizing agents (also called "curing agents" or "vulcanizers"), which include but are not limited to sulfur, may be added to the mixture later in the mixing cycle to produce the final commercial mixture.

Referring to FIG. 1, a production line 1 represents, as an example, a known single-pass sequence. The production line 1 includes an internal mixer MI that produces a masterbatch (the qualities of a masterbatch are described below). The production line 1 also includes a cooling roller tool (or "OCR") that cools the produced mixture (for example, to about 80° C.). The cooled mixture exiting the OCR arrives at one or more homogenizing roller tools (or "OCH"), where vulcanizers from a vulcanization system are added to the cooled mixture. As shown in FIG. 1, the production line 1 further includes homogenizing roller tools $OCH_X$ (where X varies from 1 to N depending on the selected mixture recipe). In single pass sequences, several homogenizing roller tools are therefore used in order not to degrade the industrial performance of the line concerned. As represented in the prior art, the number of homogenizing roller tools used and their positioning in the line can be varied depending on the desired flow rates and properties (for example, see the systems in the production lines disclosed by Korean patent KR100559201 and Chinese patent CN102019649).

In production lines for rubber mixtures with single pass sequences, it is known to add a vulcanizing agent to the rubber mixture during the subsequent curing process. In order not to cause premature partial vulcanization of the rubber, the vulcanizing agent is not added at the same time as the other ingredients. A block of vulcanizing product (or "block") is therefore introduced, which is, for example, a mixture of sulfur and a retardant. Thus, once the aforementioned steps have been carried out, the mixture is transferred to a finishing station where the vulcanizing product is added to the mixture and mixed with it (see Applicant's patent EP2707189).

As shown in FIG. 1, the production line 1 further includes a shaping installation MF where shaping of the mixture exiting from the homogenizing cylinder tool(s) OCH is performed. Several devices are known to shape the produced mixture, including, without limitation, a calender(s) and extruder(s) (which include, for example, twin-screw extruders, or "TDEs").

Upon completion at the shaping installation MF, the production line 1 transfers the mixture to a batch-off installation BO of the production line. The batch-off installation BO carries out an anti-sticking and cooling process of the mixture as known to the skilled person. During this anti-sticking and cooling process, the batch-off installation BO receives the mixture from the shaping installation MF and transports it (e.g., on a conveyor) to an immersion unit of the batch-off installation, where the mixture is immersed in an anti-sticking liquid. The mixture is then conveyed to a cooling scallop rack, where the mixture is scalloped onto carrier bars of a conveyor chain. The suspended mixture is cooled and dried by fans.

Finally, the production line 1 transfers the mixture to an end-of-line installation FL of the production line. The end-of-line installation FL receives the cooled mixture from the batch-off installation BO and carries out at least one end-of-line process. The end-of-line installation FL includes equipment for performing an end-of-line process that can be selected from palletizing and storing the rubber mixture. The equipment that is installed to perform the end-of-line process can be combined with other end-of-line equipment.

Referring to FIG. 2, a production line 2 represents, as an example, a known multi-pass sequence (see, for example, the solutions offered by HF Mixing Group at https://www.hf-mixinggroup.com/en/group/). A multi-pass sequence may include one or more successive passes through at least some of the equipment before a final pass. During multi-pass sequences, masterbatch products are produced by passing one or more times through a first line consisting of an internal mixer MI downstream of which is disposed an extruder or extruders (e.g., of the type TDE). At each pass, the mixture leaving a batch-off installation BO is palletized at a shaping installation MF. Depending on the required level of plasticity or homogenization of the produced mixture, one or more passes are made on this first line. The masterbatch obtained from the first line is cooled during each pass.

The cooled masterbatch obtained from the first line is taken to a second line of the production line 2 in a final pass in the multi-pass sequence. The second line often includes a second internal mixer MI, which is often used in combination with one or more roller tools OC. During this last pass, the vulcanizing system is introduced at the internal mixer MI. The mixing in this last pass is carried out at low temperature (about 90-100° C.) before the masterbatch is processed in a batch-off installation BO (downstream of the roller tools OCX), and the processed masterbatch is palletized in a shaping installation MF.

Referring to FIG. 3, a production line 3 represents, as an example, another known multi-pass sequence. During multi-pass sequences performed by the production line 3, masterbatches are produced by passing several times over a first line having a "tandem mixer" solution. This solution is realized with an internal mixer MI, downstream of which a second larger internal mixer BMI (or "Big MI") and extruder(s) (e.g., of the type TDE) are located. A traditional batch-off (realized by a batch-off installation BO) associated with a palletizing solution (realized by a shaping installation MF) allows cooling, anti-sticking and palletizing of the masterbatch obtained from the first line.

A second line includes an internal mixer MI with one or more extruders (for example, of the type TDE) and a known end of line installation (a batch-off installation BO and a shaping installation MF that carries out the placement in pallet of the masterbatch obtained from the second line). The last passage is carried out on this second line with the cold recovery of the masterbatch and the introduction of the vulcanizing system into the masterbatch at the internal mixer MI. The mixing cycle is still carried out at low temperature (about 90-100° C.).

With machines in current production lines (either single or multi-pass), it is very difficult to produce particular mixtures, called "decohesive", and also some sticky mixtures that are problematic on roller tools. Despite this, in the prior art, attempts exist to gain productivity on silica mixtures requiring a significant cycle time for the silanization. For example, European publications EP3359361 and EP3359362 disclose the use of a converging conical twin-screw mixer (including, for example, a machine of the type disclosed by U.S. Pat. No. 7,556,419 and proposed by Colmec S.p.A.) downstream of an internal mixer (in some embodiments, this machine can be put in place of a twin-screw extruder).

In fact, the homogenization time of the vulcanizing system on roller tools is often longer than the mixing time of the masterbatch on an internal mixer, or the cooling time of the masterbatch on a roller tool. With sticky mixtures on open tools, the sheet and/or the sleeve is sticky. It is therefore difficult to peel them off, and it is also difficult to homogenize and distribute the vulcanizing system without affecting the quality of the produced mixtures. Thus, with sticky mixtures, mixture losses occur that affect the properties of the mixtures produced and increase the risk of mixture losses, preventing the attainment of a commercial quality level of mixtures.

To achieve industrial productivity, the use of a machine with a converging twin-screw mixer allows the evacuation and shaping of a rubber mixture. With such a machine, the screws are mounted with movable doors at the end that follow the shape of the screws. Sliding shutters prevent the mixture from escaping from the sides of the two counter-rotating rollers of a roller-nose type system located just downstream of a mixer outlet. Machines incorporating these elements are disclosed by the Applicant in applications FR1902279, FR1902280, FR1902283 and 1902285.

Thus, the disclosed invention relates to the benefits of a conical twin-screw mixer or mixers that are added so as to follow an internal mixer and a roller tool. More particularly, the invention relates to the addition of a twin-screw mixing machine in place of the roller tool to allow the homogenization of the powder vulcanizing system and without risk of product loss. This architecture, being adapted for production lines performing single and multi-pass sequences, is particularly adapted to produce so-called decohesive mixtures and of certain sticky mixtures that pose problems on roller tools. By combining these elements, a mixture is obtained by performing the necessary steps to obtain a good quality of mixture, even with particularly sticky and/or decohesive mixtures.

These types of systems are associated with an external roller mixer that produces a rubber sheet of limited thickness. This sheet is then circulated by motorized belts and passes under water sprayers and suction hoods that allow a rapid lowering of the temperature.

Thus, the disclosed invention recognizes the benefits of one or more conical twin-screw mixers that are added after an internal mixer. A water spray cooling system is associated with one or more mixers equipped with conical twin-screws, thus controlling the temperature of the product as soon as it leaves the mixer and therefore controlling its properties at the end of the cycle. The addition of a twin-screw mixing machine instead of the roller tool allows to homogenize the vulcanizing system in powder form and without risk of product loss. This architecture, being adapted for production lines performing single and multi-pass sequences, is particularly suitable for the production of sticky mixtures that are problematic on roller tools. By combining these elements, a mixture is obtained by performing the necessary steps to obtain a good quality of mixture, even with particularly sticky mixtures.

SUMMARY OF THE INVENTION

The invention relates to a rubber mixture production line for performing multi-pass mixing sequences, the production line including:
   at least a first mixing line including:
      at least one internal mixer that performs a masterbatch manufacturing process;
      a hot mixing line disposed downstream of the internal mixer and having at least one twin-screw mixing machine that performs a mixing process of the rubber mixture exiting the internal mixer;
      a transfer belt installation disposed downstream of the hot mixing line for controlling a temperature and an addition of water in a rubber mixture exiting the hot mixing line;
      a batch-off installation disposed downstream of the transfer belt installation for performing an anti-sticking and cooling process of the rubber mixture exiting the transfer belt installation; and
      an end-of-line installation disposed downstream of the batch-off installation that performs one or more end-of-line processes on the rubber mixture;
   and at least one second mixing line, including:
      a twin-screw mixing machine that performs a mixing process of the rubber mixture exiting the first line;
      a transfer belt installation disposed downstream of the twin-screw mixing machine for controlling a temperature and an addition of water in a rubber mixture exiting the twin-screw mixing machine;
      a cold mixing line disposed downstream of the transfer belt installation and having at least one twin-screw mixing machine that performs a mixing process of the rubber mixture exiting the transfer belt installation;
      a batch-off installation disposed downstream of the cold mixing line that performs an anti-sticking and cooling process of the rubber mixture leaving the cold mixing line; and
      an end-of-line installation (FL') disposed downstream of the batch-off installation (BO) that performs one or more end-of-line processes of the rubber mixture;
   wherein the second line performs a final mixing process during a last pass of a multi-pass rubber mixing sequence.

In some embodiments of the production line, the transfer belt installation includes:
   a mixing and cooling system at which a rubber mixture exiting the hot mixing line is introduced;
   a transfer belt that transports the rubber mixture exiting the mixing and cooling system in the form of a sheet;
   a cooling system comprising at least one spray station and at least one suction station associated with each spray station; and a mixing and cooling system upstream of the cold mixing line at which the sheet is transported by the transfer belt.

In some embodiments of the production line, each twin-screw mixing and extrusion machine includes:
- a converging conical twin-screw mixer with a stationary frame that supports sheaths in which two screws are mounted in an inclined manner between an opening disposed upstream of the sheaths, where a feed hopper of the machine feeds the screws, and an outlet disposed downstream of the sheaths, where the mixer discharges the mixture at the end of a mixing cycle;
- one or more motors that rotate the two screws in the sheaths during the mixing cycle; and
- one or more movable doors provided at the outlet that allow, during the mixing cycle, the discharge and shaping of the rubber mixture;
- a ram that moves along the inside of the feed hopper between an elevated position, where both screws remain accessible for feeding the mixture, and a lowered position, where an inner surface of the ram forms an upper portion of the mixer; and
- a roller nose system having two counter-rotating rollers disposed just downstream of the outlet to form a sheet of the mixture exiting the mixer.

In some embodiments of the production line, the two screws are mounted in the mixer such that the crests of the threads of each screw contact tangentially the surfaces of the opposite screw so that the screws remain substantially in contact with each other upon rotation of the screws at an angle and a pitch that allows self-cleaning.

In some embodiments of the production line:
the hot mixing line includes at least two twin-screw mixing and extrusion machines; and
the cold mixing line includes at least two twin-screw mixing and extrusion machines.

In some embodiments of the production line, the end-of-line installation includes one or more pieces of equipment for performing an end-of-line process selected from palletizing and storing the rubber mixture.

The invention also relates to a mixing process for producing a variety of rubber mixtures in a production line of the type disclosed, the process including the following steps:
- a masterbatch mixing step performed by the first line, during which a rubber mixture exiting the internal mixer is mixed with additional materials prior to its introduction into the hot mixing line, and during which a rubber mixture exiting the hot mixing line is cooled at the transfer belt of the transfer belt installation; and
- a final mixing step performed by the second line after the masterbatch mixing step performed by the first line, during which the mixture exiting the first line is introduced into the twin-screw mixing machine of the second line where it is subjected to a mixing process, and during which the mixture exiting the twin-screw mixing machine is cooled at the transfer belt of the transfer belt installation, this step comprising a step of introducing the vulcanizing products to at least one twin-screw mixing machine of the cold mixing line after the completion of the process of cooling the mixture exiting the transfer belt installation of the second line.

In some embodiments of the process, the process includes the following steps:
- a step of passing the mixture exiting the hot mixing line of the first line to the transfer belt installation during the master batch mixing step; and
- a step of passing the mixture exiting the twin-screw mixing machine of the second line to the transfer belt installation during the final mixing step.

In some embodiments of the process:
the masterbatch mixing step includes an anti-sticking and cooling step of the mixture exiting the transfer belt installation that is performed by the batch-off installation, this step further including an end-of-line step that is performed by the end-of-line installation; and
the final mixing step includes a step of anti-sticking and cooling of the mixture exiting the transfer belt installation that is performed by the batch-off installation, this step further including an end-of-line step that is performed by the end-of-line installation.

In some embodiments of the process, the first line makes a plurality of successive passes through at least a portion of the first line before a final pass through the second line.

Other aspects of the invention will become apparent from the following detailed description.

BRIEF DESCRIPTION OF THE DRAWINGS

The nature and various advantages of the invention will become more apparent from the following detailed description, in conjunction with the accompanying drawings, in which the same reference numerals designate identical parts throughout, and in which.

DETAILED DESCRIPTION

Figure 4:
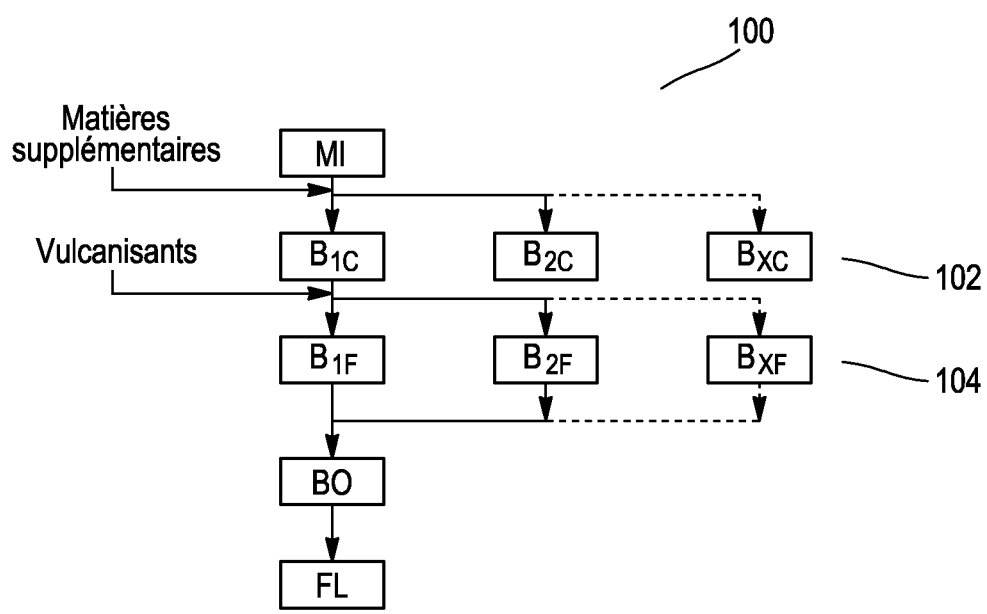
FIG. 4 represents a schematic view of an embodiment of a rubber mixture production line of the invention performing single-pass sequences.

Referring now to the figures, in which the same numbers identify identical elements, FIG. 4 represents an embodiment of a rubber mixture production line (or "production line") 100 incorporating an internal mixer MI that performs the production of a masterbatch. It is understood that a masterbatch includes a product that is already mixed but does not contain all of the ingredients of the selected mixture recipe. For example, the curing agents are not present in the masterbatch. These ingredients, which make mixing difficult, can be added in the production line 100 downstream of the internal mixer MI to complete the mixing. By "internal mixer" is meant a machine having a ram and two half-tanks (or "tanks"), each containing a rotor with one or more vanes (e.g., a Banbury or Intermix type machine for polymers).

The production line 100 also includes a cooling roller tool OCR disposed downstream of the internal mixer MI that performs cooling of the mixture exiting the internal mixer. The cooling roller tool OCR includes a pair of rollers with an adjustable gap between them. Each roller rotates around its own axis of rotation, and they are disposed so that their axes of rotation are parallel to each other and rotate in opposite directions. The rollers may have identical diameters and lengths to ensure consistent and repeatable performance in successive mixing cycles. One or both rollers may have a fluid or other cooling means as is known in the art. The production line 100 passes the rubber mixture exiting the internal mixer MI between the rollers of the cooling roller OCR to form a continuous sheet having a predetermined thickness and width.

Figure 1:
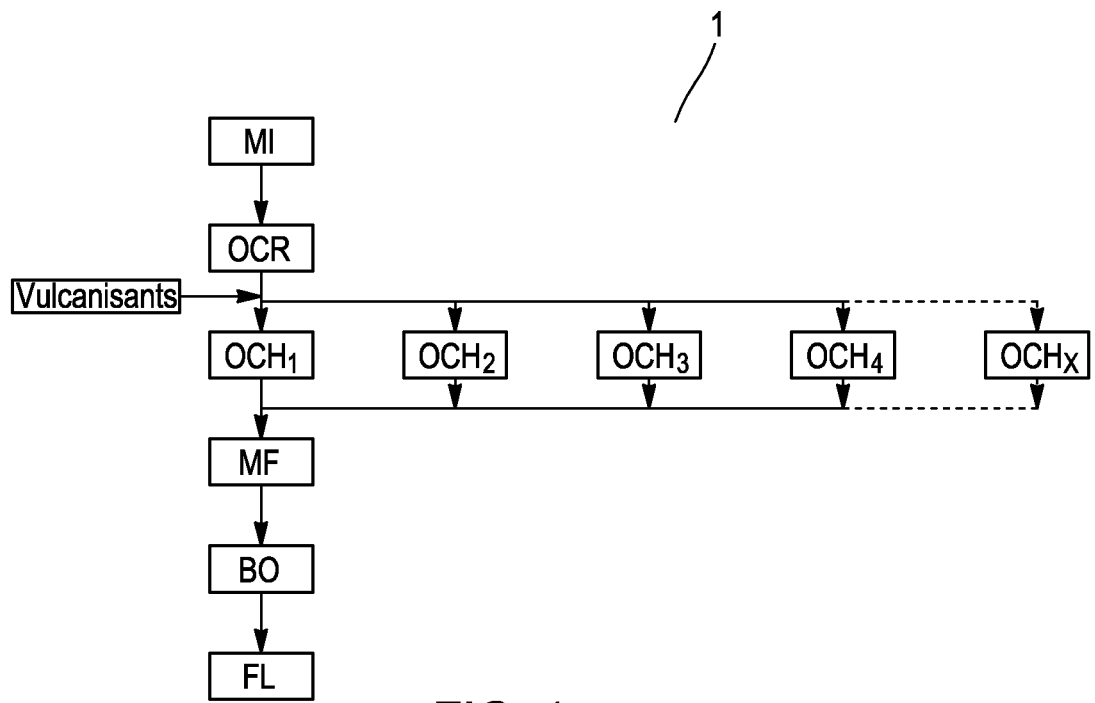
FIG. 1 represents a schematic view of a prior art rubber mixture production line performing single pass sequences.
Figure 5:
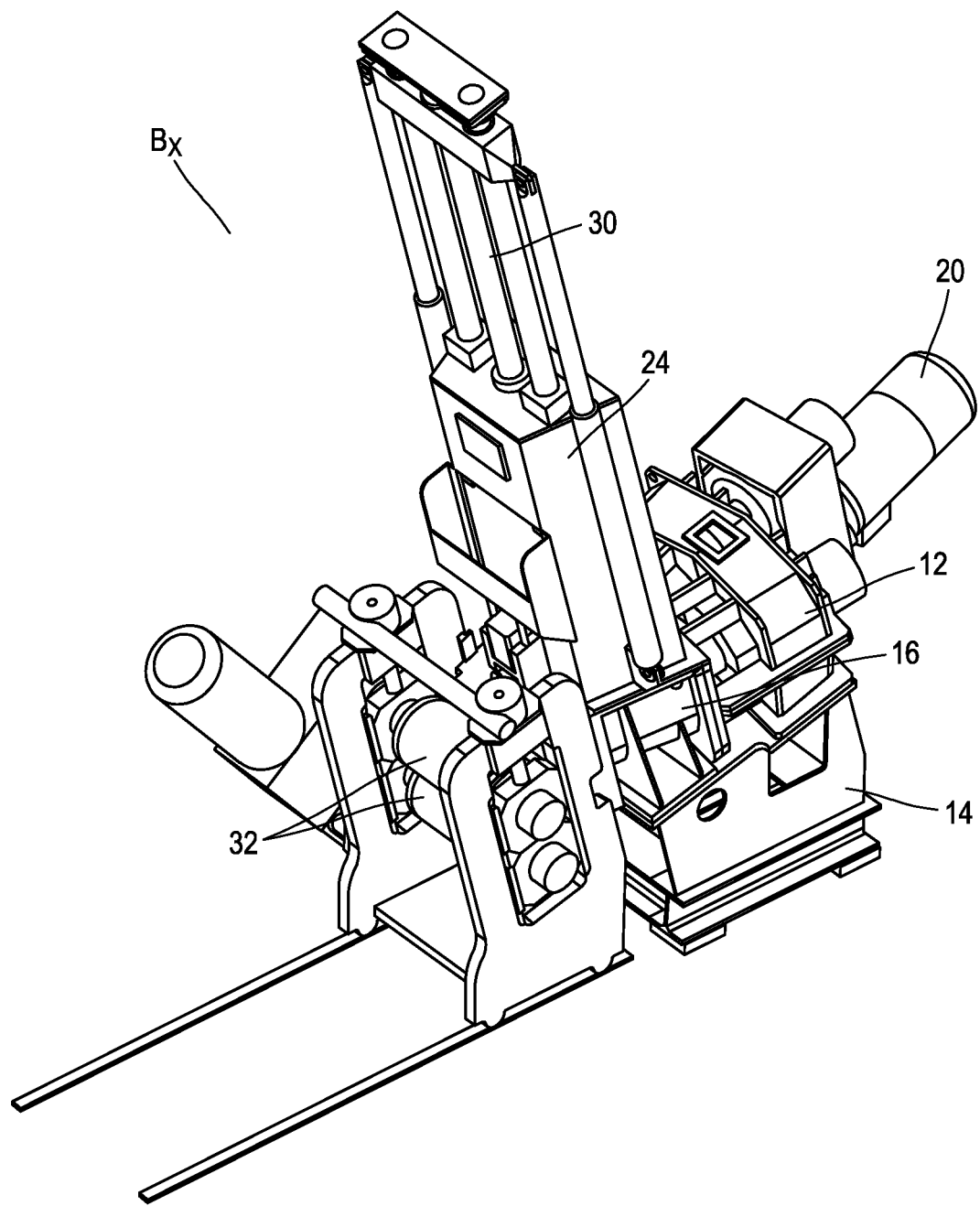
FIG. 5 represents a perspective view of a mixing and extrusion machine incorporated in the rubber mixture production line of FIG. 4.
Figure 6:
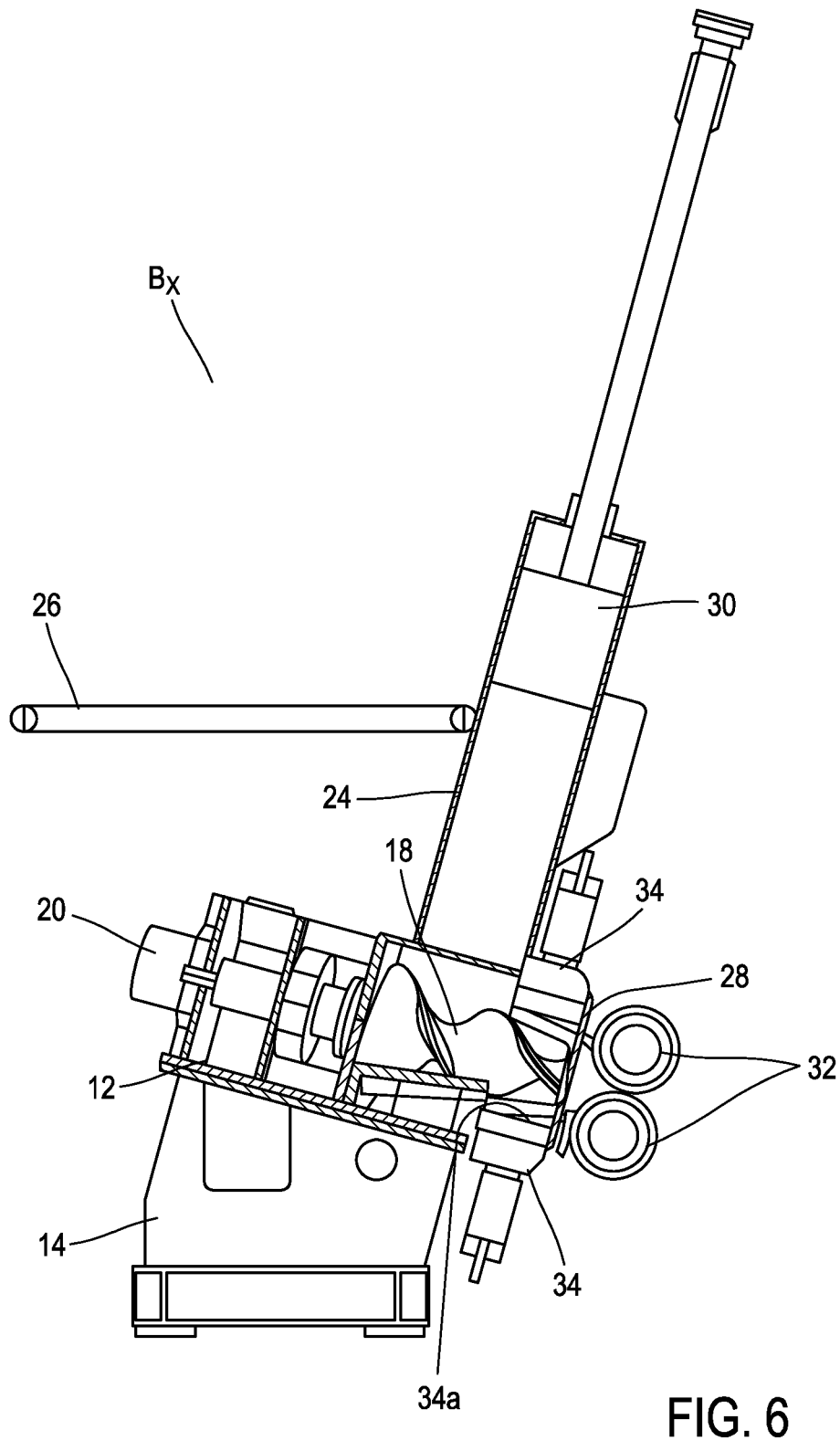
FIG. 6 represents a side view, in partial cross section, of the machine of FIG. 5 with a converging twin-screw mixer.

Referring again to FIG. 4 and also to FIGS. 5 and 6, the production line 100 includes at least one twin-screw mixing and extrusion machine (or "twin-screw mixing machine") Bx (where X varies from 1 to N depending on the selected mixture recipe) disposed downstream of the cooling roller tool OCR. The addition of twin-screw mixing machine(s) Bx in place of the homogenizing cylinder tool OCH (as shown in production line 1 of FIG. 1) allows for easy introduction of materials needed to make the product. The addition of twin-screw mixing machine(s) Bx also allows the vulcanizing system to be homogenized, either in the form of a block of vulcanizing product (or "block") or in powder form, without risk of product loss. As used herein, the terms "the" or "a" "twin-screw mixing machine" and "the" or "some" "twin-screw mixing machines" are interchangeable.

The mixing lines of the production line 100 include a hot mixing line 102 having twin-screw mixing machine(s) $B_{Xc}$ disposed downstream of the internal mixer MI. One or more additional raw materials, which often make mixing difficult, are introduced to the twin-screw mixing machines $B_{XC}$ of the hot mixing line 102 in order to complete the mixing of the mixture exiting the internal mixer MI. It is contemplated that the additional materials include resins with a glass transition temperature (or "Tg") above room temperature (e.g., resins with a Tg between 20 and 150° C., inclusive). It is also intended that the additional materials include materials with a number average molecular weight (or "Mn") restricted to a range between 300 and 4000 g/mol.

The mixture is recovered from the twin-screw mixing machines $B_{XC}$ of the hot mixing line 102 (e.g., at a temperature of about 140° C.) before it arrives at a cold mixing line 104 of the manufacturing line 100. The cold mixing line 104 includes one or more twin-screw mixing machines $B_{XF}$ disposed downstream of the hot mixing line 102. After a cooling phase, one or more vulcanizing products (either block or powder) are introduced to the twin-screw mixing machines $B_{XF}$ of the cold mixing line 104 to finish mixing the mixture exiting the hot mixing line 102. The mixture is recovered from the twin-screw mixing machines $B_{XF}$ of the cold mixing line 104 (e.g., at a temperature between 80° C. and 90° C.) before it arrives at a batch-off facility BO.

As an example, the embodiment shown in FIG. 4 includes two mixing lines (being a hot mixing line and a cold mixing line). It is understood that several hot and cold mixing lines can be integrated in the manufacturing line 100 depending on the selected rubber mixture recipe and its desired properties. As an example, each of the hot and cold mixing lines 102, 104 includes three twin-screw mixing machines Bx. It is understood that a single twin-screw mixing machine, or two or more twin-screw mixing machines, may be integrated into each mixing line depending on the selected rubber mixture recipe and its desired properties.

With particular reference to FIGS. 5 and 6, each twin-screw mixing machine Bx includes a converging conical twin-screw mixer (or "mixer") 12 that is suitable for rubber materials. The mixer 12 includes a stationary frame 14 that supports stationary sheaths (or "sheaths") 16 in which the two screws 18 are mounted. A motor or motors 20 rotate the two screws in the sheaths 16 during a mixing cycle. An upper surface of the fixed frame 14 includes guides (not shown) on which the sheaths 16 (without the screws 18) are capable of translational movement. The mixer 12 is selected from commercially available mixers, including the type disclosed by U.S. Pat. No. 7,556,419 and proposed by Colmec S.p.A. In one embodiment, this type of mixer performs mixing and discharging with Archimedes screw type screws.

The screws 18 are mounted in the sheaths 16 at an angle between an opening disposed upstream of the sheaths (where a feed hopper 24 of the twin-screw mixing machine Bx feeds the screws 18), and an outlet disposed downstream of the sheaths (where the mixer 12 discharges the mixture at the end of the mixing cycle). The sheaths 16 may include known cooling channels to manage the temperature of the mixture. The twin-screw mixing machine Bx may include an optional conveyor known to the person skilled in the art for use in feeding the mixture through the feed hopper 24. At the hot mixing line 102, the belt 26 introduces the hot mixture exiting from the internal mixer MI to the twin-screw mixing machines $B_{XC}$ of the hot mixing line 102. At the cold mixing line 104, and after a cooling phase (described below), the belt 26 introduces the mixture to the twin-screw mixing machines $B_{XF}$ of the cold mixing line 104.

Referring again to FIGS. 5 and 6, each twin-screw mixing machine Bx includes at least one movable door 28 that is provided at the outlet of the sheaths 16. The movable door 28 closes the outlet during the mixing cycle. The movable door 28 is opened at the end of the mixing cycle to allow for the discharge and downstream processing of the rubber mixture. As used herein, the terms "the movable door" and "the movable doors" are interchangeable.

In one embodiment of the twin-screw mixing machine Bx, the two screws 18 are mounted in the mixer 12 such that the crests of the threads of each screw contact tangentially the surfaces of the opposite screw. In other words, the screws are substantially in contact with each other at an angle and pitch that allow self-cleaning. The screws are said to be "substantially in contact" when the screws can clean themselves by friction, or when the two screws face each other with such a small gap between them that extruded material cannot get stuck on the screw surfaces. The screws are said to rub against each other, or be "self-cleaning," when material carried in the channel of one of the screws will not be able to remain in that channel for more than one revolution of the screw. Consequently, the material undergoes much more movement in the downstream direction, parallel to the axis of the screw, than in a lateral direction, perpendicular to the axis. In this embodiment of the screws 18, the screws are selected from interpenetrating and conjugate profiles, and particularly from co-rotating interpenetrating profiles with conjugate profiles (that are known to be self-cleaning). It is understood that there are several embodiments of the screws 18, including without limitation, of the single-, double-, or triple-threaded type, or of the conjugated double-threaded type. The screws may be selected from screws with one thread or from screws with two, three or four threads. Interpenetrating contra-rotating profiles are also known for installation and use in the mixer 12. These types of screws and their equivalents are contemplated for use in the mixer 12 depending on the selected rubber mixture recipe and its desired properties.

Referring again to FIGS. 5 and 6, each twin-screw mixing machine Bx includes the two screws 18 and a ram 30 that moves within the feed hopper 24. The ram 30 is similar to rams used in mixing processes such as those performed by Banbury-type internal mixers. As in internal mixers, the ram 30 is used to press the mixture and thereby allow more energy and shear to be imparted to the mixture (see, for example, U.S. Pat. No. 7,404,664 cited above). Guiding of the ram 30 is done between an elevated position (shown in FIG. 4), where the two screws 18 remain accessible for introducing the mixture, and a lowered position (not shown), where an inner surface of the ram 30 forms an upper portion of the mixer 12. The ram 30 is guided by slide systems as known on Banbury rams (driven, for example, by cylinders that may be pneumatic, hydraulic or their equivalents).

The ram 30 is used to press down on the mixture, allowing more energy and shear to be imparted to the mixture. The ram 30 also serves to clean the surfaces of the hopper 24 as it moves downward, removing any pieces of rubber that may stick to it. At the same time, the ram 30 also serves to improve the swallowing of the mixture as it arrives (either from the internal mixer MI or after a cooling phase performed prior to the introduction of the cooled mixture to the cold mixing line 104). The ram 30 forces the mixture to pass quickly between the screws 18 and thus prevents it from stagnating in a block above the screws.

Referring again to FIGS. 5 and 6, each twin-screw mixing machine Bx may include a roller-nose type system. A roller-nose type system includes two counter-rotating rollers 32 disposed just downstream of the outlet to form a sheet of the mixture as it exits the mixer 12. The roller-nose type system may also include an optional control means (not shown) for controlling the speed at which the mixture is fed to the rollers. The rotation of the rollers 32 is controlled by the amount of mixture supplied by the mixer 12 (sensed, for example, by a proximity sensor, by a pressure sensor, or by an equivalent device).

In an embodiment of the twin-screw mixing machine Bx, the machine further includes one or more mobile sleeves 34 (shown in FIG. 4). The mobile sleeves 34 are disposed top-down towards the outlet. It is understood that other known embodiments of the mobile sleeves may be employed (for example, left-right and angled modes). The mobile sleeves 34 include mobile elements for adjusting a predetermined gap between the sleeves 16 and the screws 18. Each mobile sleeve has a bearing surface 34a with a predetermined bearing area based on an elasticity of the mixture. It is understood that the mobile sleeves having bearing surfaces with different areas are interchangeable to ensure the use of the machine without having to replace it. The embodiment shown includes two mobile sleeves 34, but it is understood that a single mobile sleeve (or other equivalent element) or multiple mobile sleeves (or other equivalent elements) may be integrated (for example, into top-bottom mode, left-right mode, angled mode). The mobile sleeves 34 adjust the space between the sleeves and the screws to promote the flow of the mixture within the mixer 12, thus adjusting the duration and degree of mixing of the mixture.

In embodiments of the twin-screw mixing machine Bx incorporating mobile sleeves 34, during a mixing cycle, the two screws 18 circulate the mixture from an upstream side (adjacent to the feed hopper 24) to a downstream side where the mobile sleeves 34 of the twin-screw mixing machine Bx are installed. The mobile sleeves 34 are installed relative to the outlet of the mixer 12 so that, in an open position, they allow the flow of mixture to the rollers 32 of the roller-nose type system. The mobile sleeves may move in an alternating or random manner to reduce the gap between the screws and the bearing surface in a random manner, thereby creating downstream-to-upstream, and preferably top or bottom, flows of the mixture). For example, in one embodiment of the twin-screw mixing machine Bx, the mobile sleeves 34 are more likely to be in an open position at the beginning of the mixing cycle when the mixture has a high viscosity (to promote mixing flow), and are more likely to be in a closed position at the end of the mixing cycle when the mixture has a lower viscosity (to promote mixing). The guiding of the mobile sleeves 34 is done by known systems (driven, for example, by cylinders that can be pneumatic, hydraulic or their equivalents). The linear movement of the mobile sleeves 34 is managed by the amount of mixing provided by the mixer 12 (detected, for example, by a proximity sensor, by a pressure sensor or by an equivalent device).

In one embodiment of the twin-screw mixing machine Bx, the mobile sleeves may be sliding shutters (not shown) that are interposed between the rollers 32 and a front face of the mobile sleeves 34. The sliding shutters include movable elements for adjusting the flow of the mixture exiting the mixer 12. In an open position, the sliding shutters serve as "ears" for the rollers 32 that prevent the mixture from escaping from the sides of the rollers 32. Thus, the mixture is forced to pass between the two rollers and will be calendered in the form of a thin sheet of a predefined width by the opening of the sliding shutters.

Figure 7:
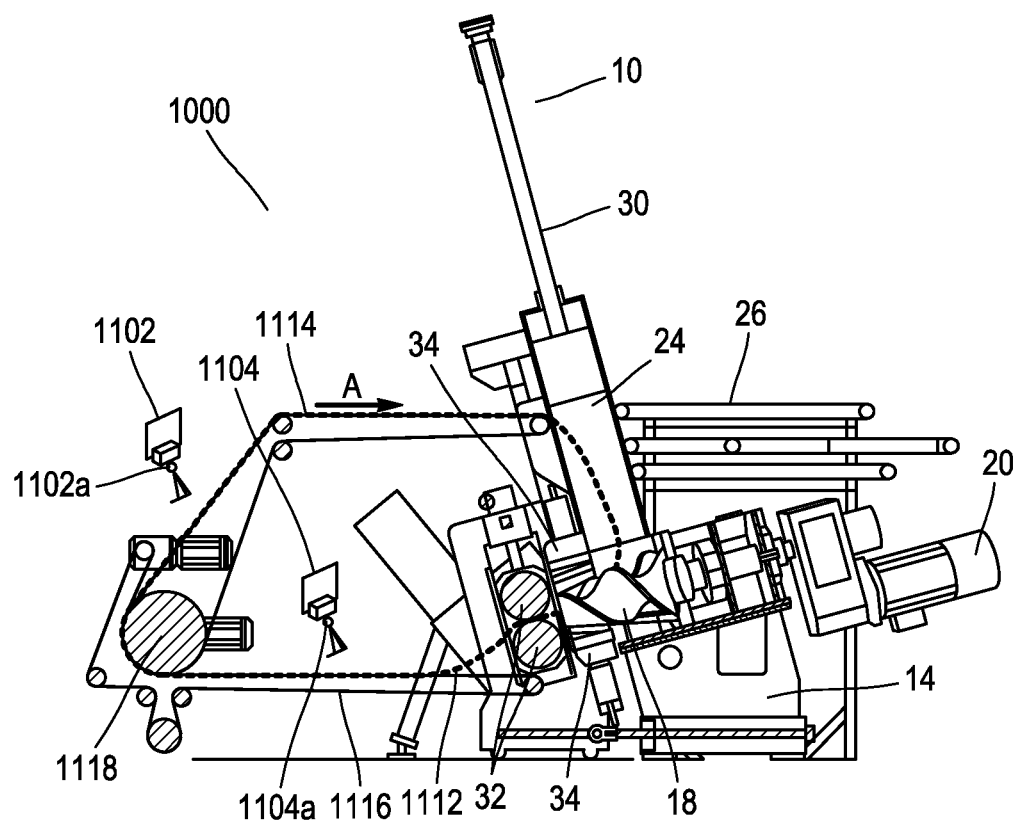
FIGS. 7 and 8 represent perspective views of a mixing and cooling system used in rubber mixture production lines of the invention.
Figure 8:
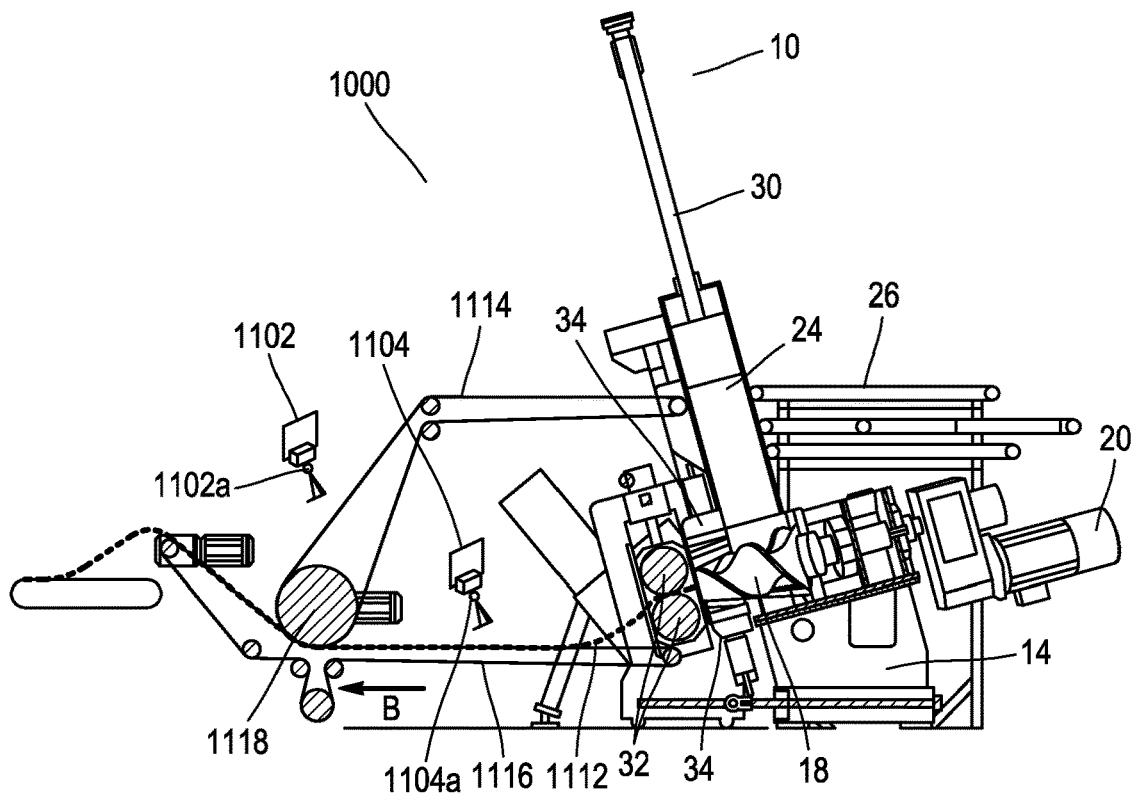

Referring again to FIGS. 4 to 6, and further to FIGS. 7 and 8, one embodiment of the production line 100 further includes a mixing and cooling system 1000 that performs a cooling phase of the mixture exiting the hot mixing line 102. The mixing and cooling system 1000 is disposed downstream of the hot mixing line 102 and upstream of the cold mixing line 104. The cooling phase(s) are thus performed before the addition of the vulcanizers to the mixture at the cold mixing line 104.

In order to perform a mixing and cooling process of the mixture exiting the hot mixing line 102, the mixing and cooling system 1000 associates a twin-screw mixing machine Bx (shown in FIGS. 5 and 6) having a cooling system as described in the Applicant's publication FR3045173 (shown with respect to FIGS. 7 and 8). The twin-screw mixing machine Bx of the mixing and cooling system 1000 includes an optional conveyor known to the skilled person (e.g., the belt 26 shown in FIG. 4) for use in feeding the mixtures exiting the hot mixing line 102 through the feed hopper 24. During a mixing cycle, the belt 26 (or other equivalent means) may be used to successively introduce the mixtures from one or more twin-screw mixing machines Bx of the hot mixing line 102 to ensure optimal productivity of the production line 100. The mixtures may be introduced in the form of a continuous sheet (or "sheet") 1112 (shown in FIGS. 7 and 8) or in an equivalent form. The sheet 1112 may depart on belt systems as described in FR3045173 before returning to the twin-screw mixing machine Bx through the feed hopper 24 during a mixing cycle.

The mixing and cooling system 1000 includes at least one upper spray station 1102 and at least one lower spray station 1104. To control a temperature and a water addition to a rubber mixture, each spray station 1102, 1104 incorporates at least one spray installation and at least one suction installation. The spraying installation sprays water that is controllably discharged after evaporation by the suction installation. The mixing and cooling system 1000 circulates the continuous sheet 1112 that exits the rollers 32 of the twin-screw mixing machine Bx (see arrow A in FIG. 7 and arrow B in FIG. 8).

In the embodiment shown in FIG. 7, the predetermined path of travel is formed at least in part by a continuous belt 1114 positioned at the upper spray station 1102 and another continuous belt 1116 positioned at the lower spray station 1104. The belts 1114, 1116 are driven by at least one large-diameter roller 1118. The continuous travel path may remain "endless" (i.e., uninterrupted) during at least one ongoing mixing and cooling cycle and may remain endless over one or more successive cycles. Depending on the properties of the selected rubber mixture, the speed of the continuous belts 1114, 1116 may be adjusted within a mixing cycle or between successive cycles as needed.

The mixing and cooling system 1000 may include a spray installation that sprays water along at least a portion of the sheet 1112 as the sheet travels along the predetermined path. The spray installation may include one or more upper spray ramps 1102a positioned at the upper spray station 1102 and one or more lower spray ramps 1104a positioned at the lower spray station 1104 (as used herein, the terms "spray ramps" and "ramps" are used interchangeably). Each ramp 1102a, 1104a is in communication with a water and air supply source (not shown) for supplying water and air. An actual temperature and/or actual water addition of the mixture exiting the twin-screw mixing machine Bx can be detected, which time is determined in a cooling phase. It is understood that the ramps should be configured to deliver a predetermined flow rate of the water spray as determined for the current cooling phase. It is understood that the water flow rate may be changed between successive cooling phases.

The mixing and cooling system 1000 may include a suction installation for drawing in water particles generated by the ramps 1102a, 1104a. For example, at least one suction hood (not shown) may be positioned downstream of each respective ramp 1102a, 1104a and in communication with a suction source. The suction creates an airflow in the direction opposite to the direction of flow of the continuous sheet 1112. Thus, the belts 1114, 1116 carry the continuous sheet 1112 while the hoods draw in air in respective opposite directions. The addition of water through the ramps 1102a, 1104a charges the ambient air with moisture. The air containing the evaporated water is sucked out to prevent the introduction of water into the mixture.

The mixing and cooling system 1000 may also include a detection system that includes at least one flow sensor. The detection system is used to detect and to generate one or more signals indicative of the actual water flow rate. The detection system includes sensors that detect an actual flow rate delivered by each ramp 1102a, 1104a. The detection system may also include an intake air flow sensor at each hood for verifying the intake air flow. Such verification may include determining that a sensed airflow rate meets predetermined airflow parameters for the indicated rubber mixture.

The mixing and cooling system 1000 may be used in a variety of ways to effect cooling of the mixture while maintaining its desired properties. In one embodiment, the target temperature and target water addition are achieved prior to adding the vulcanization products at the cold mixing line 104. This allows cycle times to be shortened while maintaining the beneficial properties of the selected rubber mixture, allowing for optimal productivity.

In all embodiments of the production line 100, the vulcanizing system introduced at the cold mixing line 104 (and thus introduced to the twin-screw mixing machines $B_{XF}$) contains vulcanizing products (or "vulcanizers") that include, without limitation, sulfur and cross-linking or vulcanizing agents. Vulcanizer systems can be introduced either as a block (being a mass of vulcanizer) or as a powder (including powder introduced in known hot melt bags). These vulcanizers are fed directly with the cooled mixture (including mixtures cooled by the mixing and cooling system 1000 of FIGS. 7 and 8) directly to each twin-screw mixing machine $B_{XF}$ of the cold mixing line 104 (see FIG. 4). Thus, the use of the twin-screw mixing machines $B_{XF}$, each of which is a closed machine, allows the vulcanizing system to be used directly in powder form. The productivity of the production line is thus improved, as the step of manufacturing and storing the block-shaped vulcanizing products is no longer mandatory.

In some embodiments of the production line 100, a target temperature of the produced mixture is reached before the vulcanizers are added at the mixing line 104. Thus, mixing cycle times can be shortened while maintaining the beneficial properties of the selected rubber mixture, allowing for optimal productivity.

Figure 2:
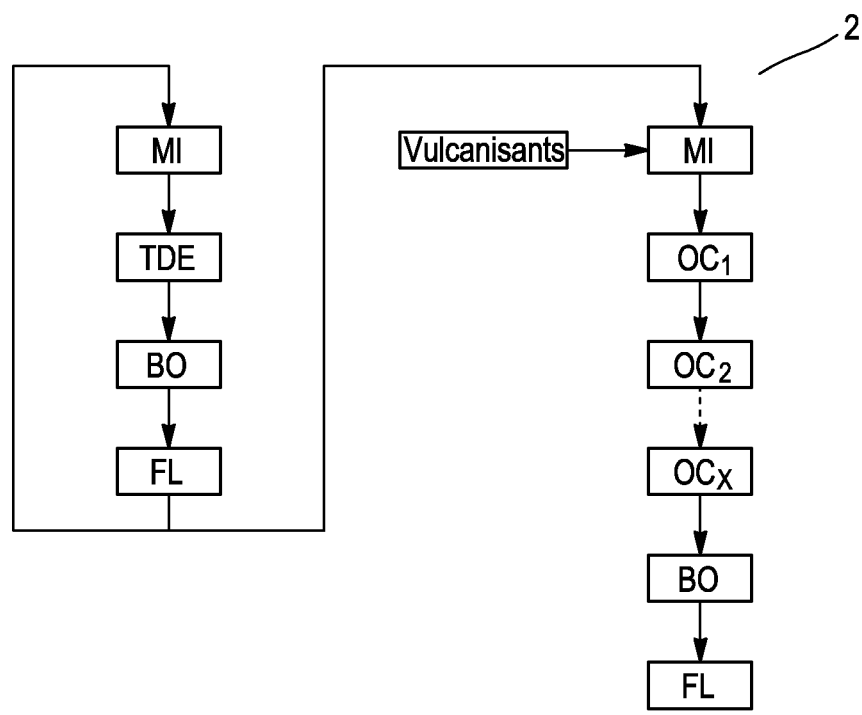
FIGS. 2 and 3 represent schematic views of prior art rubber mixture production line performing multi-pass sequences.
Figure 3:
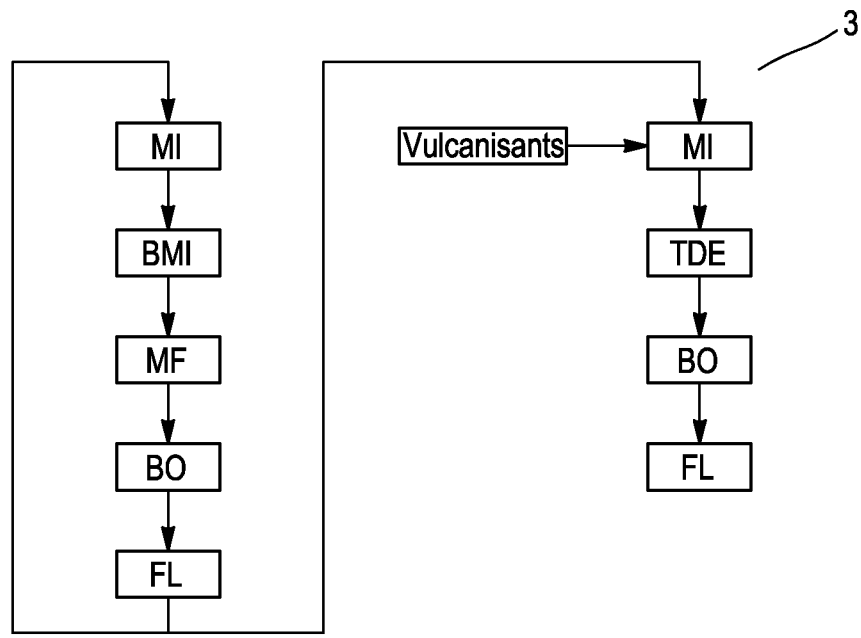

Referring again to FIG. 4, the production line 100 further includes a batch-off installation BO that is disposed downstream of the hot and cold mixing lines 102, 104. The batch-off BO installation includes equipment for performing an anti-sticking and cooling process of the mixture as known to the skilled person. The batch-off installation BO is of the type commercially available and described above with respect to the production lines 1, 2 and 3 of the respective FIGS. 1, 2 and 3.

Referring again to FIG. 4, the production line 100 further includes an end-of-line installation FL disposed downstream of the batch-off installation BO. The end-of-line installation includes equipment for performing one or more end-of-line processes on the mixture. The end-of-line installation FL is of the type commercially available and described above with respect to the production line 1 of FIG. 1. In one embodiment of the production line 100, the end-of-line installation FL performs a palletization process of the mixture during which the mixture exiting the batch-off installation BO is deposited on one or more pallets at a time. The palletized mixture is thus shaped for transport and storage before being used in the production of finished products (e.g., tires).

Figure 9:
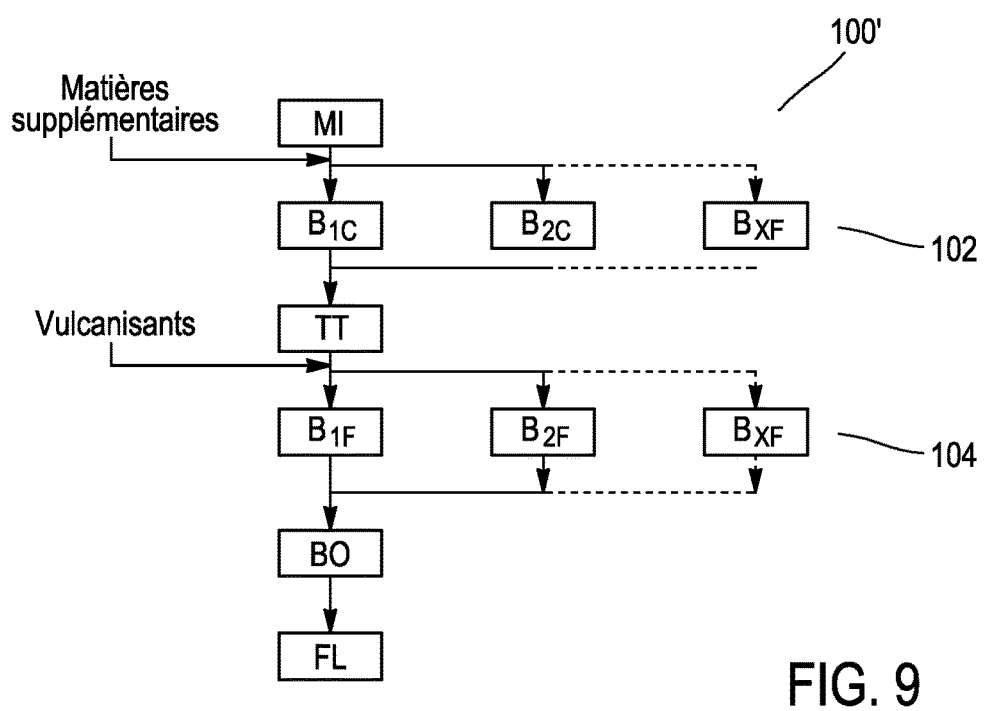
FIG. 9 represents a schematic view of another embodiment of a rubber mixture production line performing single pass sequences.
Figure 10:
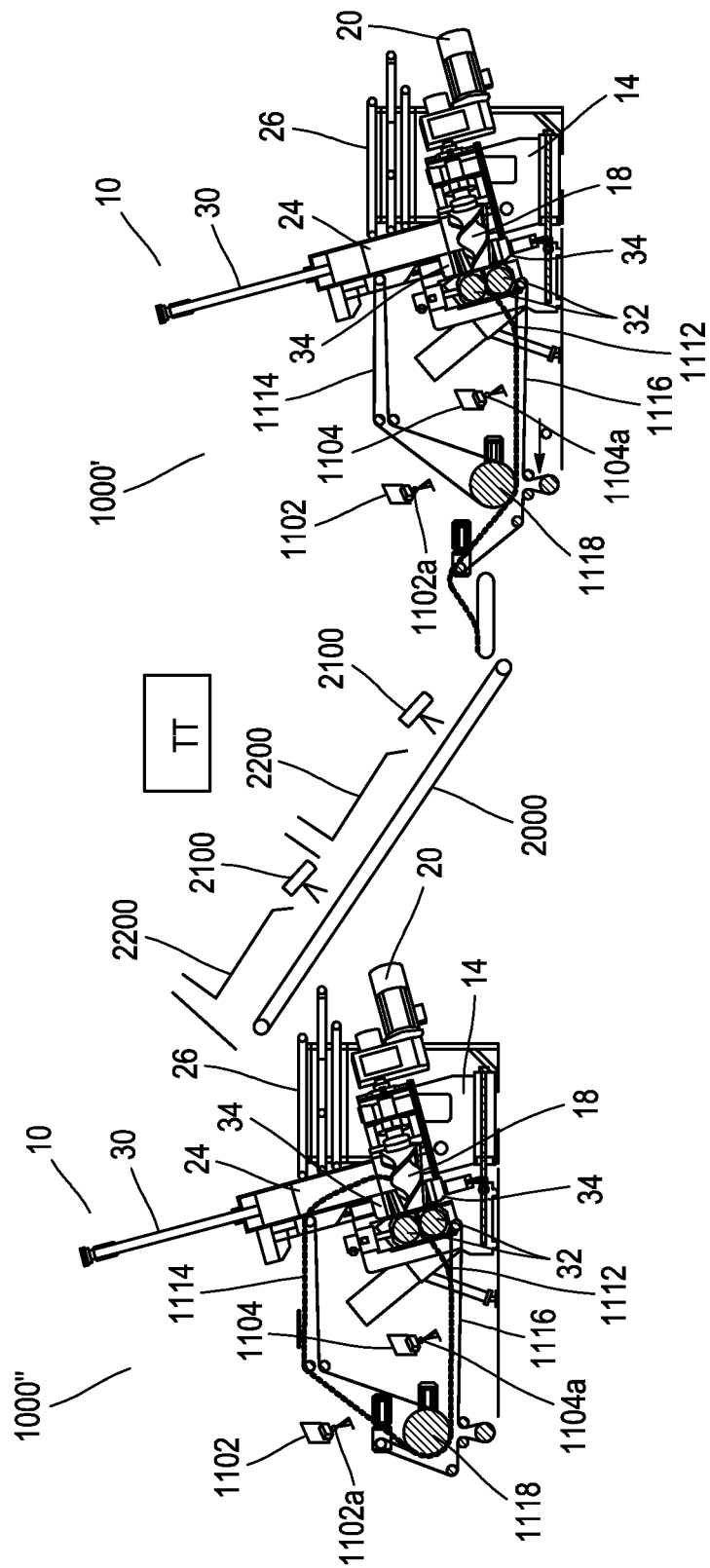
FIG. 10 represents a schematic view of a transfer belt installation of the production line of FIG. 9.

Referring again to FIGS. 4 through 8, and further to FIGS. 9 and 10 (in which the same numbers identify corresponding elements), a production line 100' represents another embodiment of a production line. This embodiment, which incorporates an auxiliary cooling process, includes all of the elements described and shown with respect to embodiments of the production line 100 incorporating a mixing and cooling system. Such a mixing and cooling system is of the type described above with reference to the production line 100 for performing one or more phases of cooling the mixture (e.g., the mixing and cooling system 1000 shown in FIGS. 7 and 8). The cooling phases are performed prior to adding the vulcanizers to the mixture at the cold mixing line 104.

The production line 100' further includes a transfer installation TT incorporating a cooling system of the type disclosed in Applicant's publication FR3044949. At the transfer installation TT, a rubber mixture exiting the hot mixing line 102 is introduced to a mixing and cooling system 1000' in order to perform one or more cooling phases of the rubber mixture. The rubber mixture exits the mixing and cooling system 1000' in the form of a sheet 1112 that is transported by a transfer belt 2000 to a mixing and cooling system 1000" upstream of the cold mixing line 104.

In order to control a temperature and addition of water to the sheet 1112 exiting the mixing and cooling system 1000' (see arrow C in FIG. 10), the cooling system of the transfer installation TT includes one or more spray stations 2100 and one or more suction stations 2200. Each spray station includes one or more ramps having nozzles that are positioned to spray the sheet 1112 at a predefined water flow rate (as described above with respect to FIGS. 7 and 8). At least one suction hood is positioned downstream of each ramp to draw in air after spraying by the corresponding ramp (as described above with respect to FIGS. 7 and 8).

Thus, the spray stations 2100 and the suction stations 2200 together perform an auxiliary cooling process as described above with respect to the mixing and cooling system 1000. This auxiliary cooling process, performed at the level of the transfer belt 2000, ensures that the rubber mixture has an acceptable temperature and water addition in the single-pass and multi-pass sequences. It is understood that one or more transfer belts may be installed that correspond to one or more twin-screw machines $B_{XC}$ of the hot mixing line 102 and/or one or more twin-screw machines $B_{XF}$ of the cold mixing line 104. The sheet 1112 arriving at the cold mixing line 104 already has properties suitable for carrying out a subsequent process, regardless of whether the process is part of a single-pass sequence or a multi-pass sequence.

With reference to FIGS. 4 to 8, a detailed description is given as an example of a mixing process of the invention. It is understood that the process can be easily adapted for all embodiments of the production lines 100, 100' incorporating one or more embodiments of the twin-screw mixing machine Bx.

In initiating a mixing process of the invention, the mixing process includes a step of introducing to the internal mixer MI the various raw materials required to produce the product. The raw materials introduced to the internal mixer MI include, without limitation, elastomeric material(s) (e.g., natural rubber, synthetic elastomer, and combinations and equivalents thereof) and one or more ingredients, such as one or more processing agents, protective agents, and reinforcing fillers. The raw materials may also include one or more other ingredients such as carbon black, silica and oils. All of the raw materials are fed to the internal MI mixer in varying amounts depending on the desired performance of the resulting products of the mixing processes (e.g., tires).

The mixing process further includes a hot mixing step of the mixture exiting the mixer MI in the form of a masterbatch. The hot mixing step includes the step of introducing a portion of additional materials to the mixture exiting the internal mixer MI. For example, one or more additional materials may be packed in hot melt bags that are placed directly on a sheet of the mixture exiting the internal mixer MI.

The hot mixing step further includes a mixing step at the level of the hot mixing line 102, which step is performed by the twin-screw mixing machines $B_{XC}$ of the hot mixing line 102. This step includes a step of introducing the mixture exiting the internal mixer MI and the additional materials into the twin-screw mixing machine B1 of the hot mixing line 102. During this step, the mixture incorporating the additional materials may be introduced into each available twin-screw mixing machine $B_{XC}$ (e.g., by the belt 26 of FIG. 5). During this step, in each twin-screw mixing machine employed, the screws 18 continue to rotate and the movable doors 28 remain closed. The ram 30 remains in its elevated position during this step, and the rollers 32 remain on standby during this step. In embodiments of the twin-screw mixing machine Bx including the mobile sleeves 34, the mobile sleeves remain in their open position (i.e., with a gap between the sleeves and the screws at maximum) during this step. As an example, the mixture exiting the hot mixing line 102 may reach a temperature of about 140° C.

It is understood that the introduction of the mixture and additional materials into the twin-screw mixing machine(s) Bx can be accomplished either all at once or in a staggered manner depending on the selected rubber mixture recipe, without loss of the additional materials. In embodiments of the production line 100 incorporating a hot mixing line 102 having two or more twin-screw mixing machines $B_{XC}$, a portion of the mixture may be introduced in the same manner into each twin-screw mixing machine, together with assigned additional materials. It is understood that one or more twin-screw mixing machines $B_{XC}$ may perform the step of mixing the mixture and additional materials, and other twin-screw mixing machines $B_{XC}$ may remain on standby. In this manner, the mixture or a portion thereof (and/or the additional material(s) or a portion thereof) can be directed to the standby twin-screw mixing machines to ensure high productivity.

During the step of mixing the mixture and additional materials performed by the twin-screw mixing machine $B_{XC}$, the screws 18 are rotated forward with the movable doors 28 closed. During this step, the rotating screws cause the mixture to move downstream of the mixer upon introduction of the mixture (or additional materials) into the twin-screw mixing machine. In any embodiment of the twin-screw mixing machine Bx, the speed of rotation may be variable during the cycle. When the screws 18 are interpenetrated, the rotational speed of the two screws is synchronized.

During the step of mixing the mixture and additional materials performed by the twin-screw mixing machine Bx, the ram 30 descends after the step of introducing the mixture and additional materials into it. During this step, the screws 18 continue to rotate during this step, and the rollers 32 remain in standby.

During the step of mixing the mixture and additional materials performed by the twin-screw mixing machine Bx, after the ram 30 is lowered, the screws 18 are rotated in reverse with the movable doors 28 closed. During this step, the screws rotate in a direction opposite to the forward rotation of the screws. The entire mixture in the twin-screw mixing machine Bx has a downstream-to-upstream movement in the machine that will cause additional distribution of the additional material.

In embodiments of the twin-screw mixing machine Bx having mobile sleeves 34, during the step of mixing the cooled mixture realized by the twin-screw mixing machine Bx, the ram 30 is returned to the top, and the screws 18 are rotated forward with the movable doors 28 closed. The mobile sleeves 34 are completely closed, either by simultaneous closure or by alternate closure of the movable elements. The rollers 32 remain on standby.

During the step of mixing the mixture and additional materials realized by the twin-screw mixing machine Bx, the emptying of this machine is performed. To perform the emptying of the twin-screw mixing machine, the movable doors 28 open to release the mixture from the outlet toward the cold mixing line 104. In embodiments of the twin-screw mixing machine Bx in which the movable doors include two or more movable elements, the movable elements open simultaneously or alternately. During emptying, the ram 30 is lowered during this step, and the rollers 32 are rotated to allow the mixture to be discharged in sheets. In embodiments of the twin-screw mixing machine Bx further including mobile sleeves 34, the mobile sleeves remain fully closed, but they can be adjusted based on a volume of the mixture exiting the mixer. The screws 18 continue to rotate in order to completely empty the twin-screw mixing machine Bx.

Upon completion of the step of mixing the mixture and additional materials realized by the twin-screw mixing machine Bx of the hot mixing line 102, this step may restart after the twin-screw mixing machine Bx has finished emptying. It is understood that this step can be performed in an iterative manner depending on the selected mixture recipe. Thanks to the self-cleaning of the screws 18, all types of mixtures, including sticky mixtures, are thus completely discharged from the machine.

In the production line 100' incorporating the transfer belt installation TT (see FIG. 9), the step of mixing the mixture and additional materials further includes a step of passing the mixture exiting the hot mixing line 102 to the transfer belt installation TT. This step may be performed for a predefined time depending on the selected rubber mixture recipe in order to control the temperature and addition of water to the mix.

In embodiments of the production lines 100, 100' incorporating a mixing and cooling system, the step of mixing the mixture and additional materials further includes a step of performing one or more phases of cooling the mixture. This step may be performed one or more times depending on the selected rubber mixture recipe in order to perform the cooling phase(s) prior to adding the vulcanizers to the mixture at the cold mixing line 104.

The mixing process further includes a step of mixing the cooled mixture at the level of the cold mixing line 104, this step being performed by the twin-screw mixing machines $B_{XF}$ of the cold mixing line 104. During this step, the mixture is introduced into each twin-screw mixing machine $B_{XF}$ of the cold mixing line 104 (for example, by the belt 26 of FIG. 5). As an example, the mixture exiting the cold mixing line 104 may reach a temperature of about 80° C. to 90° C.

The step of mixing the cooled mixture further includes a step of introducing the necessary vulcanizing products to the twin-screw mixing machines $B_{XF}$. In the embodiments of the production lines 100, 100' shown, during this step, the vulcanizing products may be directly introduced into the feed hopper 24, including powder vulcanizing products.

It is understood that the introduction of the cooled mixture and the vulcanizers to the twin-screw mixing machines $B_{XF}$ may be accomplished either all at once or in a staggered manner depending on the selected rubber mixture recipe, without loss of the powdered vulcanizers. In embodiments of the production lines 100, 100' incorporating two or more twin-screw mixing machines in the cold mixing line 104, a portion of the cooled mixture may be introduced in the same manner into each twin-screw mixing machine together with assigned vulcanizing products. It is understood that one or more twin-screw mixing machines $B_{XF}$ may perform the step of mixing the cooled mixture, and other twin-screw mixing machines $B_{XF}$ may remain on standby. In this manner, the cooled mixture or a portion thereof can be directed to the standby twin-screw mixing machines to ensure high productivity.

During the step of mixing the cooled mixture performed by the twin-screw mixing machine $B_{XF}$, the screws 18 are rotated forward with the movable doors 28 closed. During this step, the rotating screws cause the mixture to move downstream of the mixer upon introduction of the mixture (or additional materials) into the twin-screw mixing machine. In any embodiment of the twin-screw mixing machine $B_{XF}$, the speed of rotation may be variable during the cycle. When the screws 18 are interpenetrated, the rotational speed of the two screws is synchronized.

During the step of mixing the cooled mixture performed by the twin-screw mixing machines $B_{XF}$, the ram 30 descends after the step of introducing the cooled mixture and the vulcanizing products therein. During this step, the screws 18 continue to rotate during this step, and the rollers 32 remain in standby.

During the step of mixing the cooled mixture performed by the twin-screw mixing machine $B_{XF}$, after the ram 30 is lowered, the screws 18 are rotated in reverse with the movable doors 28 closed. During this step, the screws rotate in a direction opposite to the forward rotation of the screws. The entire mixture located in the twin-screw mixing machine $B_{XF}$ has a downstream-to-upstream movement of the machine that will cause additional distribution of additional material.

In embodiments of the twin-screw mixing machine Bx including mobile sleeves 34, during the step of mixing the cooled mixture performed by the twin-screw mixing machine $B_{XC}$, the ram 30 is returned to the top, and the screws 18 are rotated in a forward direction with the movable doors 28 closed. The mobile sleeves 34 are fully closed, either by simultaneous closure or by alternate closure of the movable elements. The rollers 32 remain on standby.

During the step of mixing the cooled mixture performed by the twin-screw mixing machine $B_{XF}$, the emptying of this machine is performed. To perform the emptying of the twin-screw mixing machine, the movable doors 28 open to release the mixture from the outlet to a process downstream of the twin-screw mixing machine. In embodiments of the twin-screw mixing machine Bx where the movable doors include two or more movable elements, the movable elements open either simultaneously or alternately. During emptying, the ram 30 is lowered during this step, and the rollers 32 are rotated to allow the mixture to be discharged in sheets. In embodiments of the twin-screw mixing machine Bx further including mobile sleeves 34, the mobile sleeves remain fully closed, but they can be adjusted based on a volume of mixture exiting the mixer. The screws 18 continue to rotate in order to completely empty the twin-screw mixing machine Bx.

At the end of the step of mixing the cooled mixture performed by the twin-screw mixing machine $B_{XF}$, the rubber mixture is finished mixing. After the completion of the emptying of each twin-screw mixing machine $B_{XF}$ employed in the cold mixing line 104, this step can be restarted. It is understood that this step can be performed in an iterative manner depending on the selected mixture recipe. Due to the self-cleaning of the screws 18, all types of mixtures, including sticky and de-cohesive mixtures, are thus completely removed from the machine. It is also envisaged that the twin-screw mixing machine Bx can perform process(es) concerning the plasticization of natural elastomers.

The mixing process further includes a step of anti-sticking and cooling the mixture leaving the cold mixing line 104. This step is performed by the batch-off installation BO disposed downstream of the mixing line 104. In some embodiments of the mixing process, a target temperature of the cooled mixture is reached at the end of this step.

The mixing process further includes a final end-of-line step that is performed by the end-of-line installation FL disposed downstream of the batch-off installation BO. In some embodiments of the mixing process, this step includes a step of palletizing the mixture during which the mixture exiting the batch-off installation BO is deposited on one or more pallets at a time. In some embodiments of the mixing process, this step may further include at least one step of storing the rubber mixture.

It is understood that one or more steps of the mixing process of the invention may be performed in an iterative manner depending on the selected mixture recipe.

Figure 11:
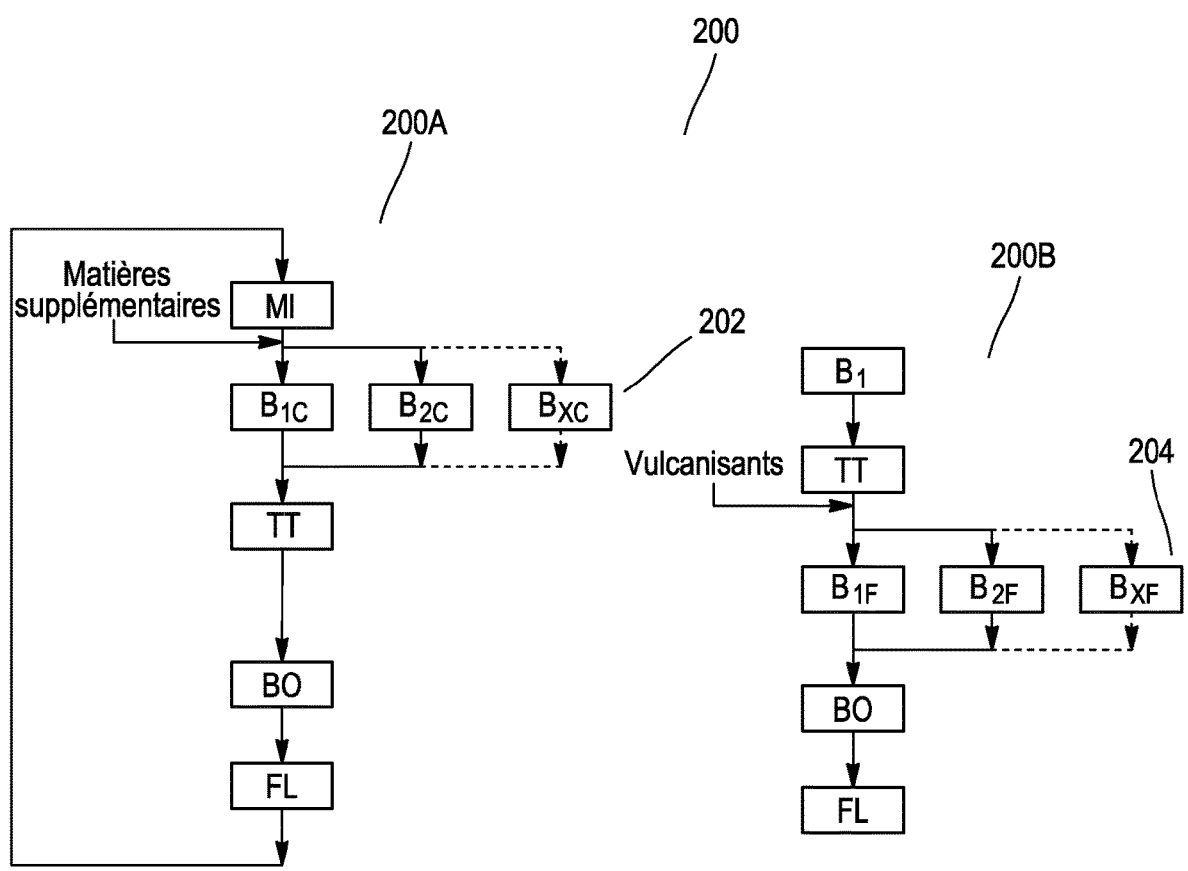
FIG. 11 represents a schematic view of an embodiment of a rubber mixture production line performing multi-pass sequences.

Referring further to FIG. 11, FIG. 11 depicts an embodiment of a rubber production line (or "production line") 200 that makes multi-pass sequences. The line 200 has two lines including a first masterbatch line (or "first line") 200A and a second final mixture line (or "second line") 200B. The first line 200A incorporates an internal mixer(s) MI that performs the manufacture of a masterbatch as described above. The first line 200A also includes a hot mixing line 202 disposed downstream of the internal mixer MI. The hot mixing line 202 includes at least one or more twin-screw mixing and extrusion machines $B_{XC}$ (where X varies from 1 to N depending on the mixing recipe selected). Each twin-screw mixing and extrusion machine is of the type described above with respect to FIGS. 5 and 6. The first line 200A of the production line 200 further includes a transfer belt installation TT of the type described above with respect to the production line 100' (see FIGS. 9 and 10). A batch-off installation BO is disposed downstream of the transfer belt installation TT, and an end-of-line installation FL is disposed downstream of the batch-off installation BO. The batch-off BO and end-of-line FL installations are selected from the commercially available types described above.

The second line 200B of the production line 200 includes an architecture incorporating a twin-screw mixing and extrusion machine $B_1$ of the type described above with respect to FIGS. 5 and 6. A transfer belt installation TT' is disposed downstream of the twin-screw mixing and extrusion machine $B_1$. The transfer belt installation TT' is of the type described above with respect to the production line 100' (see FIGS. 9 and 10) in order to control the temperature and addition of water to the mixture exiting the twin-screw mixing and extrusion machine $B_1$.

The second line 200B of the production line 200 further includes a cold mixing line 204 disposed downstream of the transfer belt installation TT'. The cold mixing line 204 includes at least one or more twin-screw mixing and extrusion machines $B_{XF}$ (where X varies from 1 to N depending on the selected mixture recipe). Each twin-screw mixing and extrusion machine is of the type described above with respect to FIGS. 5 and 6. A batch-off installation BO' is disposed downstream of the cold mixing line 204, and an end-of-line installation FL' is disposed downstream of the batch-off installation BO. The batch-off BO' and end-of-line FL' installations are selected from commercially available types described above.

As an example, the embodiment shown in FIG. 11 includes three twin-screw mixing machines Bx installed in each of the lines 200A, 200B. It is understood that a single twin-screw mixing machine, or two or more twin-screw mixing machines, may be integrated into each line 200A, 200B of the production line 200 depending on the selected rubber mixture recipe and its desired properties.

In one embodiment of a mixing process of the invention performed by the production line 200, the process includes a step of mixing a masterbatch performed by the first line 200A. During this step, the mixture exiting the mixer MI is mixed with additional materials prior to its introduction into the hot mixing line 202. The mixture may be fed to one or more twin-screw mixing machines $B_{XC}$ depending on the selected rubber mixture recipe. During this step, the mixture exiting the hot mixing line 202 is cooled at the transfer belt installation TT, where an auxiliary cooling process is performed (as above with respect to the manufacturing line 100').

The step of mixing a masterbatch performed by the first line 200A further includes a step of anti-sticking and cooling of the mixture exiting the transfer belt installation TT, this step being performed by the batch-off installation BO. In some embodiments of the mixing process, a target temperature of the cooled mixture is reached at the end of this step. This step further includes an end-of-line step that is performed by the end-of-line installation FL. In some embodiments of the mixing process, this step includes a step of palletizing the mixture during which the mixture exiting the batch-off installation BO is deposited on one or more pallets at a time. In some embodiments of the mixing process, this step may further include at least one step of storing the rubber mix.

In one embodiment of the process, the first line 200A makes several successive passes through at least some of the equipment in the additional line before a final pass through the second line 200B.

The mixing process of the invention performed by the production line 200 further includes a final mixing step that is performed by the second line 200B after the end of the process performed by the first line 200A. During this step, the mixture exiting the first line 200A is introduced into the twin-screw mixing machine $B_{1C}$ where it is subjected to a mixing process. During this step, the mixture exiting the twin-screw mixing machine $B_{1C}$ is cooled at the transfer belt installation TT', where an auxiliary cooling process is performed by a cooling system of the type described above with respect to FIGS. 9 and 10.

The final mixing step further includes a step of introducing the vulcanizing products (either in powder or in block form) to one or more twin-screw mixing machines $B_{XF}$ of the cold mixing line 204. It is understood that the introduction of the cooled mixture and vulcanizing products to the twin-screw mixing machines $B_{XF}$ may be performed all at once or in a staggered manner depending on the selected rubber mixture recipe without loss of the powdered vulcanizing products.

The final mixing step performed by the second line 200B further includes a step of anti-sticking and cooling of the mixture exiting the cold mixing line 204. This step is performed by the batch-off installation BO' of the second line 200B. In some embodiments of the mixing process, a target temperature of the cooled mixture is reached at the end of this step. This step further includes an end-of-line step that is performed by the end-of-line installation FL' of the second line 200B. In some embodiments of the mixing process, this step includes a step of palletizing the mixture during which the mixture exiting the batch-off installation BO' is deposited on one or more pallets at a time. In some embodiments of the mixing process, this step may further include at least one step of storing the rubber mixture.

During multi-pass sequences, the first line 200A produces masterbatches that are taken up cold on the second line 200B. It is conceivable that a single production line 200 can be used to do both the masterbatch manufacturing process and the vulcanizer addition process.

In one embodiment of the manufacturing line 200, the mixing line 204 may incorporate a mixing and cooling system of the type described above with respect to FIGS. 7 and 8. Such a mixing and cooling system performs a cooling phase of the mixture exiting the transfer belt installation TT'. The cooling phases may be performed prior to the addition of the vulcanizers to the mixture at the cold mixing line 204.

The mixing processes of the invention may be done by PLC control and may include pre-programming of management information. For example, a process setting may be associated with the properties of the mixture that is supplied to the hot and cold mixing lines, including the properties of the screws 18, the properties of the cooled mixture and/or vulcanizers entering the feed hopper 24, and the properties of the mixture exiting the twin-screw mixing machines Bx.

In all embodiments, a monitoring system could be implemented in any portion of a production line 100, 100' and 200. At least a portion of the monitoring system may be provided in a wearable device such as a mobile network device (e.g., cell phone, laptop, camera, wearable network-connected device(s) (including "augmented reality" and/or "virtual reality" devices, wearable network-connected clothing, and/or any combinations and/or equivalents)).

In embodiments of the invention, the production line 100, 100', 200 (and/or a rubber production facility that incorporates the production line 100, 100', 200) may receive voice commands or other audio data (representing, for example, a start or a stop of a step of the mixing process if the intended properties of the mix are not achieved). The request may include a request for the current state of a mixing process. A generated response may be represented audibly, visually, tactilely (e.g., using a haptic interface) and/or virtually and/or by augmented means.

In an embodiment, the process of the invention may include a step of training the production line 100, 100', 200 (or training a rubber manufacturing facility that incorporates the manufacturing line 100, 100', 200) to recognize values representative of the mixture exiting the production line (e.g., temperature and viscosity values) and to make a comparison with target values. This step may include a step of training the production line 100, 100', 200 to recognize non-equivalences between the compared values. Each training step may include a classification generated by self-learning means. This classification may include, without limitation, parameters of the additional materials and the masterbatches of the selected rubber mixture recipe, configurations of the self-cleaning screws, durations of mixing cycles incorporating the mixing process of the invention, and expected values at the end of a mixing cycle in progress. It is conceivable that detection and comparison steps may be performed iteratively. In embodiments of the process of the invention, the data obtained may feed a neural network(s) that manages one or more production lines 100, 100', 200 and/or one or more facilities and/or systems in which the production lines 100, 100', 200 are incorporated.

The production line 1' incorporating the twin-screw mixing machine $B_1$ can homogenize, process and cool rubber mixtures allowing for operation with sticky mixtures in an industrial manner. The term "sticky" defines a property of a rubber mixture that varies between mixture formulations. Below are described the formulation parameters influencing the tackiness of mixtures on industrial processes.

Example

Considering the level of mixture stickiness in production sites, the properties of a composition of a mixture influence this level, including:
 The ratio of the reinforcing filler ratio and the plasticizer ratio, with this ratio indicating a stickier mixture as the ratio is lowered.
 The ratio of resin in the mixture, with this ratio indicating a stickier mixture as the ratio increases.
 The volume fraction of elastomer, which indicates a stickier mixture as the volume fraction decreases.

Also considered is the characteristic of the elastomer that may be part of the tackiness component of the mixtures. In this example, a Mooney ML1+4 100° C. dry elastomer <50 points, or the presence of isoprene is considered. Mooney, also known as viscosity or plasticity, characterizes, in a known way, solid substances. An oscillating consistometer as described in ASTM D1646 standard (1999) is used. This plasticity measurement is carried out according to the following principle: the sample analyzed in its raw state (i.e., before curing) is molded (formed) in a cylindrical chamber heated to a given temperature (e.g., 35° C. or 100° C.). After one minute of preheating, the rotor rotates within the specimen at 2 rpm and the torque required to maintain this motion is measured during 4 minutes of rotation. The Mooney viscosity (ML 1+4) is expressed in "Mooney units" (with 1 UM=0.83 Nm) and corresponds to the value obtained at the end of the 4 minutes A very sticky mixture is not necessarily an "extreme" mixture on one of the criteria, but it is the combination of all the criteria that gives its stickiness and therefore its difficulty of realization. By multiplying these criteria, a "sticky index" is found and represented by the table below:

TABLE 1

| 1 - Ratio Carbon Black/plasticizer | | | | | | | | | | | |
|---|---|---|---|---|---|---|---|---|---|---|---|
| Carbon black/Plasticizer index | 150.38 | 140.30 | 130.23 | 120.15 | 110.08 | 100.00 | 89.92 | 79.85 | 69.77 | 59.70 | 49.62 |
| Severity value | 1 | 1.10 | 1.20 | 1.30 | 1.40 | 1.50 | 1.60 | 1.70 | 1.80 | 19.0 | 2.00 |
| 2 - Resin presence | | | | | | | | | | | |
| Resin stickiness index | 0.00 | 20.00 | 40.00 | 60.00 | 80.00 | 100.00 | 120.00 | 140.00 | 160.00 | 180.00 | 200.00 |
| Severity value | 1 | 1.10 | 1.20 | 1.30 | 1.40 | 1.50 | 1.60 | 1.70 | 1.80 | 1.90 | 2.00 |
| 3 - Mixture cohesion | | | | | | | | | | | |
| Volume fraction of elastomer index | 143 | 134 | 126 | 117 | 109 | 100 | 91 | 83 | 74 | 66 | 57 |
| Severity value | 1 | 1.10 | 1.20 | 1.30 | 1.40 | 1.50 | 1.60 | 1.70 | 1.80 | 1.90 | 2.00 |

In an empirical way and according to different criteria of industrial feasibility, an assessment is made on the industrial feasibility of several mixtures. The limit of feasibility is established for sticky indices above 3.5 and 4.5 points.

Examples of Mixtures

TABLE 2

|  | KM Sticky | KM Sticky bis | KM non sticky |
|---|---|---|---|
| 1 - Ratio Carbon black/Plasticizer | | | |
| Carbon black/Plasticizer index | 94.7 | 75.2 | 117.3 |
| Severity value | 1.55 | 1.75 | 1.33 |
| 2 - Resin Presence | | | |
| Resin stickiness index | 132.0 | 112.0 | 20.0 |
| Severity value | 1.66 | 1.56 | 1.10 |
| 3 - Mixture Cohesion | | | |
| Volume fraction of elastomer index | 67.2 | 85.4 | 99.4 |
| Severity value | 1.88 | 1.67 | 1.50 |
| Stickiness Index | 4.9 | 4.5 | 2.2 |

The two mixtures "KM sticky" and "KM sticky bis", with respective indexes 4.9 and 4.5, are not considered to have a satisfactory industrial feasibility. However, the machine of the invention allows these mixtures to be made industrially with a higher productivity compared to conventional machines of the internal mixer or external mixer type.

In order to obtain the mixtures with the desired properties in shorter cycles, the invention preserves all the advantages of a production line incorporating single pass and multipass sequences. At the same time, the invention combines the solutions of converging twin-screw mixers. Thus, a single production line is provided that is capable of handling a variety of mixtures, including sticky and decohesive mixtures, without changing equipment in a mixing facility.

The terms "at least one" and "one or more" are used interchangeably. Ranges that are presented as being "between a and b" include both "a" and "b" values.

Although particular embodiments of the disclosed apparatus have been illustrated and described, it will be understood that various changes, additions, and modifications may be practiced without departing from the spirit and scope of this disclosure. Accordingly, no limitations should be imposed on the scope of the described invention except those set forth in the appended claims.

The invention claimed is:

1. A rubber mixture production line for performing multi-pass mixing sequences, the production line comprising:
at least a first mixing line comprising:
at least one internal mixer that performs a masterbatch manufacturing process;
a hot mixing line disposed downstream of the internal mixer and comprising at least one twin-screw mixing machine that performs a mixing process of the rubber mixture exiting the internal mixer;
a transfer belt installation disposed downstream of the hot mixing line for controlling a temperature and an addition of water in a rubber mixture exiting the hot mixing line;
a batch-off installation disposed downstream of the transfer belt installation for performing an anti-sticking and cooling process of the rubber mixture exiting the transfer belt installation; and
an end-of-line installation disposed downstream of the batch-off installation that performs one or more end-of-line processes on the rubber mixture; and
at least one second mixing line comprising:
a twin-screw mixing machine that performs a mixing process of the rubber mixture exiting the first line;
a transfer belt installation disposed downstream of the twin-screw mixing machine for controlling a temperature and an addition of water in a rubber mixture exiting the twin-screw mixing machine;
a cold mixing line disposed downstream of the transfer belt installation and comprising at least one twin-screw mixing machine that performs a mixing process of the rubber mixture exiting the transfer belt installation;
a batch-off installation disposed downstream of the cold mixing line that performs an anti-sticking and cooling process of the rubber mixture leaving the cold mixing line; and
an end-of-line installation disposed downstream of the batch-off installation that performs one or more end-of-line processes of the rubber mixture,
wherein the second line performs a final mixing process during a last pass of a multi-pass rubber mixing sequence.

2. The rubber mixture production line of claim 1, wherein the transfer belt installation comprises:
a mixing and cooling system at which a rubber mixture exiting the hot mixing line is introduced;
a transfer belt that transports the rubber mixture exiting the mixing and cooling system in the form of a sheet;
a cooling system comprising at least one spray station and at least one suction station associated with each spray station; and
a mixing and cooling system upstream of the cold mixing line at which the sheet is transported by the transfer belt.

3. The rubber mixture production line of claim 1, wherein each twin-screw mixing and extrusion machine comprises:
a converging conical twin-screw mixer with a stationary frame that supports sheaths in which two screws are mounted in an inclined manner between an opening disposed upstream of the sheaths, where a feed hopper of the machine feeds the screws, and an outlet disposed downstream of the sheaths, where the mixer discharges the rubber mixture at the end of a mixing cycle;
one or more motors that rotate the two screws in the sheaths during the mixing cycle;
one or more movable doors provided at the outlet that allow, during the mixing cycle, the discharge and shaping of the rubber mixture;
a ram that moves along the inside of the feed hopper between an elevated position, where both screws remain accessible for feeding the rubber mixture, and a lowered position, where an inner surface of the ram forms an upper portion of the mixer; and
a roller nose system comprising two counter-rotating rollers disposed downstream of the outlet to form a sheet of the rubber mixture exiting the mixer.

4. The rubber mixture production line of claim 3, wherein the two screws are mounted in the mixer such that crests of the threads of each screw contact tangentially the surfaces of the opposite screw so that the screws remain substantially in contact with each other upon rotation of the screws at an angle and a pitch that allows self-cleaning.

5. The rubber mixture production line of claim 1, wherein the hot mixing line comprises at least two twin-screw mixing and extrusion machines, and
the cold mixing line comprises at least two twin-screw mixing and extrusion machines.

6. The rubber mixture production line of claim 1, wherein the end-of-line installation comprises one or more pieces of equipment for performing an end-of-line process selected from palletizing and storing the rubber mixture.

7. A mixing process for producing a variety of rubber mixtures in the rubber mixture production line of claim 1, the process comprising the following steps:
- a masterbatch mixing step performed by the first line, during which a rubber mixture exiting the internal mixer is mixed with additional materials prior to its introduction into the hot mixing line, and during which a rubber mixture exiting the hot mixing line is cooled at the transfer belt of the transfer belt installation; and
- a final mixing step performed by the second line after the masterbatch mixing step performed by the first line, during which the rubber mixture exiting the first line is introduced into the twin-screw mixing machine of the second line where it is subjected to a mixing process, and during which the rubber mixture exiting the twin-screw mixing machine is cooled at the transfer belt of the transfer belt installation, the final mixing comprising a step of introducing the vulcanizing products to at least one twin-screw mixing machine of the cold mixing line after the completion of the process of cooling the rubber mixture exiting the transfer belt installation of the second line.

8. The mixing process of claim 7, further comprising the following steps:
- a step of passing the rubber mixture exiting the hot mixing line of the first line to the transfer belt installation during the master batch mixing step; and
- a step of passing the rubber mixture exiting the twin-screw mixing machine of the second line to the transfer belt installation during the final mixing step.

9. The mixing process of claim 7, wherein the masterbatch mixing step comprises an anti-sticking and cooling step of the rubber mixture exiting the transfer belt installation that is performed by the batch-off installation and an end-of-line step that is performed by the end-of-line installation, and
- the final mixing step comprises a step of anti-sticking and cooling of the rubber mixture exiting the transfer belt installation that is performed by the batch-off installation and an end-of-line step that is performed by the end-of-line installation.

10. The mixing process of claim 7, wherein the first line makes a plurality of successive passes through at least a portion of the first line before a final pass through the second line.

* * * * *